United States Patent [19]

Imai

[11] 4,396,255
[45] Aug. 2, 1983

[54] STANDARD PHOTOGRAPHIC LENS SYSTEM

[75] Inventor: Toshihiro Imai, Hachiouji, Japan

[73] Assignee: Olympus Optical Co., Ltd., Tokyo, Japan

[21] Appl. No.: 197,278

[22] Filed: Oct. 15, 1980

[30] Foreign Application Priority Data

Oct. 18, 1979 [JP] Japan ................................ 54-134623

[51] Int. Cl.³ ........................... G02B 9/60; G02B 9/62
[52] U.S. Cl. ...................................... 350/464; 350/465
[58] Field of Search ............................... 350/464, 465

[56] References Cited

U.S. PATENT DOCUMENTS 4,214,815 7/1980 Shimokura ........................ 350/464

FOREIGN PATENT DOCUMENTS 53-40521 4/1978 Japan .
53-17054 6/1978 Japan .
54-30821 3/1979 Japan .

Primary Examiner—John K. Corbin
Assistant Examiner—Paul M. Dzierzynski
Attorney, Agent, or Firm—Cushman, Darby & Cushman

[57] ABSTRACT

A standard photographic lens system comprising a first, second, third, fourth and fifth lens components in which the first lens component is a positive meniscus lens, the second lens component is a negative meniscus lens, the third lens component is a positive meniscus lens, the fourth lens component consists of a negative lens and positive lens which are cemented together or separated from each other, and the fifth lens components is a biconvex lens, the distance from the surface of the lens system to the film surface being short, the back focal length thereof being long and field angle thereof being 55° or more.

9 Claims, 6 Drawing Figures

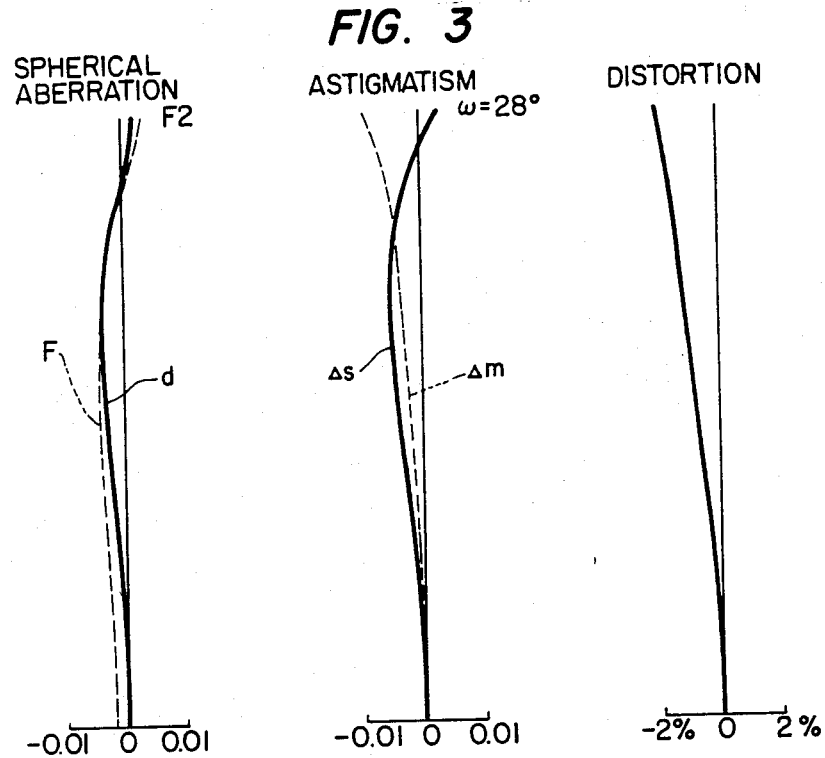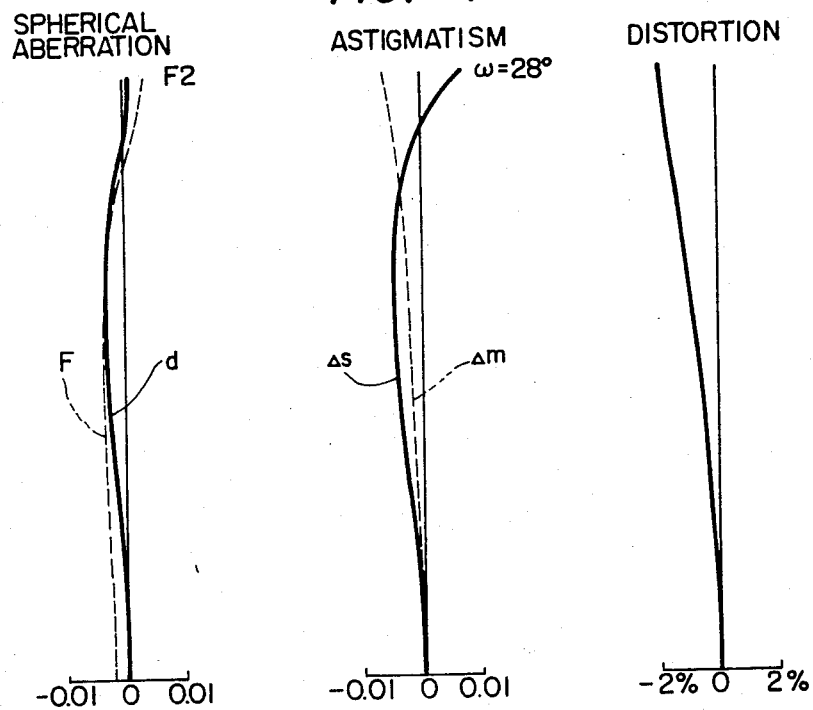

STANDARD PHOTOGRAPHIC LENS SYSTEM

BACKGROUND OF THE INVENTION (a) Field of the Invention

The present invention relates to a standard photographic lens system and, more particularly, to a standard photographic lens system for which the distance from the first surface of the lens system to the film surface is short, back focal length is long though the focal length thereof is comparatively short, and field angle is wider than those of known standard photographic lens system.

(b) Description of the Prior Art

For known standard photographic lens systems, the field angle ($2\omega$) is about 46° to 47°. Among users, however, there is desire to use a lens system with a wider field angle as the standard lens system and, therefore, it is required to develop a lens system for which the field angle is increased to about 56°. When, however, the lens system is used as an interchangeable lens system for a single-lens reflex camera comprising a quick-return mirror, which is most popular among single-lens reflex cameras, it is indispensable that the lens system has a long back focal length. For known Gauss type standard photographic lens systems, the ratio of back focal length to the focal length is 0.8f or less. As a known lens system for which the back focal length is made larger than 0.8f, there is the lens system disclosed in Japanese published unexamined patent application No. 30821/79. The above-mentioned lens system is of such type that the lens elements constituting the cemented doublet to Gauss type lens system arranged in front of stop are separated from each other, and its back focal length is increased to about 0.85f. However, this back focal length is not satisfactorily long.

SUMMARY OF THE INVENTION

It is, therefore, a primary object of the present invention to provide a standard photographic lens system of such type that the lens elements constituting the cemented doublet of Gauss type lens system arranged in front of stop are separated from each other for which the distance from the first surface of the lens system to the film surface is short, i.e., about 1.6 times of focal length of the lens system, the back focal length is long, i.e., 0.9 times or more of focal length thereof, and the field angle is 55° or more, and is wider than those of known standard photographic lens systems.

The lens system according to the present invention has lens configuration as shown in FIG. 1, i.e., it comprises a first, second, third, fourth and fifth lens components, the first lens component being a positive meniscus lens arranged convex toward the object side, the second lens component being a negative meniscus lens arranged convex toward the object side, the third lens component being a positive meniscus lens arranged convex toward the object side, the fourth lens component consisting of a negative lens and positive lens which are cemented together or separated from each other, and the fifth lens component being a biconvex lens. Besides, the lens system according to the present invention is arranged to satisfy the following conditions:

$$1.55f < L < 1.7f \quad (1)$$

$$0.88f < f_B < 0.93f \quad (2)$$

$$-1.4f < f_2 < -0.8f \quad (3)$$

$$-3.2f < f_{23} < -0.8f \quad (4)$$

$$0.45f < r_3 < 0.52f \quad (5)$$

$$0.26f < r_6 < 0.37f \quad (6)$$

$$-0.35f < r_7 < -0.3f \quad (7)$$

$$1.65 < n_6 < 1.8 \quad (8)$$

In the above-mentioned conditions, reference symbol L represents the distance from the first surface of the lens system to the film surface (when the distance to the object is $\infty$), reference symbol f represents the focal length of the lens system as a whole, reference symbol $f_B$ represents the back focal length, reference symbol $f_2$ represents the focal length of the second lens component, reference symbol $f_{23}$ represents the total focal length of the second and third lens components, reference symbols $r_3$, $r_6$ and $r_7$ respectively represent radii of curvature of the surface on the object side of the second lens component, surface on the image side of the third lens component and surface on the object side of the fourth lens component, and reference symbol $n_6$ represents the refractive index of the fifth lens component.

Now, the meanings of the above-mentioned conditions are explained below.

Conditions (1) and (2) are established for the purpose of attaining the object of the lens system according to the present invention. The condition (1) is established in order to arrange the lens system compactly. If L becomes larger than the upper limit of the condition (1), the lens system cannot be made compact. If L becomes smaller than the lower limit of the condition (1), thicknesses of lenses should be made small and, consequently, it becomes difficult to actually manufacture the lenses. The condition (2) relates to the back focal length. If $f_B$ becomes smaller than the lower limit of the condition (2), it becomes impossible to obtain the required back focal length. If $f_B$ becomes larger than the upper limit, it becomes difficult for this type of lens system to correct aberrations in well balanced state and to thereby obtain a lens system with favourable performance.

Conditions (3) and (4) are to define the second and third lens components which are the most characteristic of this of lens system. Lower limits of these conditions are required for the purpose of bringing the rear principal plane of the lens system as a whole toward the image side in order to make the back focal length long. If $f_2$ and/or $f_{23}$ become smaller than the lower limits of conditions (3) and/or (4), it becomes impossible to make the back focal length long enough. Upper limits of conditions (3) and (4) are required for preventing aggravation of aberrations, chiefly spherical aberration. If, therefore $f_2$ and/or $f_{23}$ become larger than the upper limits of conditions (3) and/or (4), spherical aberration, coma, etc. will be aggravated and the image quality will decrease.

The conditions (5), (6) and (7) are established in order to make the back focal length long, i.e., about 0.9f. Besides, these conditions are established also in order to arrange so that the surface $r_3$ on the object side of the second lens component and surfaces $r_6$ and $r_7$ of the third and fourth lens components which are facing each other become approximately concentric in respect to the stop located between the third and fourth lens components and to maintain symmetry of offaxial rays by fulfilling the conditions (5), (6) and (7) at the same time as the conditions (3) and (4). That is, the lower limit of condition (5), upper limit of conditon (6) and lower limit of condition (7) are established in order to make the back focal length long. Besides, the lower limits of conditions (5) and (6) and upper limit of condition (7) are required in order to minimize spherical aberration. The upper limits of conditions (5) and (6) and lower limit of condition (7) are established in order to maintain symmetry of offaxial rays. Therefore, if $r_3$ becomes smaller than the lower limit of condition (5) and $r_6$ becomes larger than the upper limit of condition (6) and $r_7$ becomes smaller than the lower limit of condition (7), it becomes impossible to make the back focal length long and, moreover, spherical aberration becomes large. Spherical aberration becomes large also when $r_3$ becomes smaller than the lower limit of condition (5), $r_6$ becomes smaller than the lower limit of condition (6) and $r_7$ becomes larger than the upper limit of condition (7). It becomes impossible to maintain symmetry of offaxial rays if $r_3$ becomes larger than the upper limit of condition (5), $r_6$ becomes larger than the upper limit of condition (6) and $r_7$ becomes smaller than the lower limit of condition (7).

The upper limit of condition (8) is established in order to correct spherical aberration, which is overcorrected because radii of curvature $r_{10}$ and $r_{11}$ of respective surfaces of the fifth lens component are made large for the purpose of making the back focal length long. In this type of lens system like the lens system according to the present invention, powers of negative lenses become strong and, consequently, Petzval's sum becomes unfavourable. The lower limit of condition (8) is established in order to correct Petzval's sum. If $n_6$ becomes larger than the upper limit of condition (8), spherical aberration will be overcorrected. If $n_6$ becomes smaller than the lower limit of condition (8), Petzval's sum becomes unfavourable.

As shown by the embodiments described later, the fourth lens component of the lens system according to the present invention may be arranged either as a cemented doublet or as two separate lens elements having a small airspace between them. When, however, the fourth lens component is arranged as a cemented doublet, influence on aberrations etc. becomes slightly different from the case that the fourth lens component is arranged as two separate lens elements. Taking this point into consideration, it is preferable to attach different conditions shown below to the cases that the fourth lens component is arranged as a cemented doublet and as a two separate lens elements.

When the fourth lens component is arranged as a cemented doublet, it is necessary to make the negative refractive power of cemented surface strong in order to make the back focal length long. For this purpose, it is preferable to select the refractive indices $n_4$ and $n_5$ of respective lens elements as $0.07 < n_4 - n_5$. Besides, in order to increase the above-mentioned negative refractive power, it is preferable to intensify the negative power of the second lens component by arranging the airspace $d_4$ between the second and third lens components as $0.07f < d_4$. For the same reason, it is possible to obtain more favourable result when $f_{23}$ in the condition (4) is selected in the range of $-1.2f < f_{23} < -1.07f$. In case that the fourth lens component is arranged as two separate lens elements, it is possible to make the back focal length satisfactorily long when $n_4$ and $n_5$ are arranged as $0.03 < n_4 - n_5$ so that the air lens formed between the negative and positive lens elements constituting the fourth lens component has negative refractive power and, moreover, when $d_4$ and $f_{23}$ are selected as $0.03f < d_4$ and $f_{23} < -2.8f$. Besides, in case that the fourth lens component is arranged as two separate lens elements, it is more preferable to select $f_{23}$ in the condition (4) as $-3f < f_{23} < -2.8f$. Furthermore, it is preferable to arrange so that the focal length $f_A$ of air lens, which is formed between the negative and positive lens elements of the fourth lens component due to the fact that they are arranged as separate lens elements, is selected as $-10f < f_A$. The focal length $f_A$ is expressed by the following formula wherein reference symbol $d_7'$ represents the thickness of air lens, and reference symbols $r_8$ and $r_8'$ respectively represent radii of curvature of respective surfaces of air lens.

$$\frac{1}{f_A} = \frac{1-n_4}{n_4} \cdot \frac{1}{r_8} + \frac{n_5 - 1}{n_4} \cdot \frac{1}{r'_8} - \frac{(1-n_4)(n_5-1)}{n_4} \cdot \frac{d'_7}{r_8 r'_8}$$

It is possible to make the back focal length $f_B$ satisfactorily long when it is arranged as $-10f < f_A$, $0.03 < n_4 < n_5$, $0.03f < d_4$, and $-3f < f_{23} < -2.8f$ as described in the above. If any of these conditions are not satisfied, it becomes difficult to make $f_B$ satisfactorily long.

BRIEF DESCRIPTION OF THE DRAWINGS

FIGS. 3 through 6 respectively show graphs illustrating aberration curves of Embodiments 1 through 4 of the present invention.

DETAILED DESCRIPTION OF THE PREFERRED EMBODIMENTS

Figure 1:
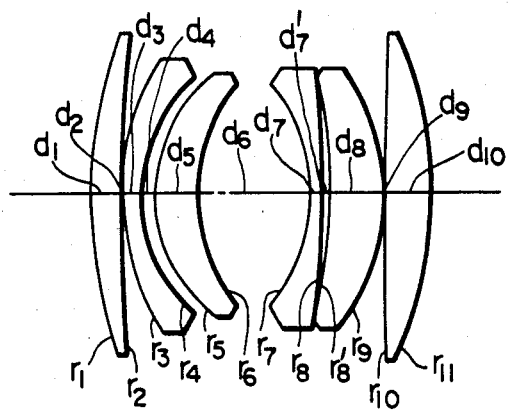
FIG. 1 shows a sectional view of Embodiments 1 and 2 of the lens system according to the present invention.

Now, preferred embodiments of the lens system according to the present invention explained in the above are shown below.

Embodiment 1:

| | | |
|---|---|---|
| $r_1 = 1.072$ | | |
| $d_1 = 0.070$ | $n_1 = 1.72$ | $v_1 = 50.25$ |
| $r_2 = 5.078$ | | |
| $d_2 = 0.002$ | | |
| $r_3 = 0.464$ | | |
| $d_3 = 0.033$ | $n_2 = 1.60729$ | $v_2 = 49.29$ |
| $r_4 = 0.287$ | | |
| $d_4 = 0.043$ | | |
| $r_5 = 0.306$ | | |
| $d_5 = 0.089$ | $n_3 = 1.68250$ | $v_3 = 44.65$ |
| $r_6 = 0.344$ | | |
| $d_6 = 0.235$ | | |
| $r_7 = -0.327$ | | |
| $d_7 = 0.024$ | $n_4 = 1.76182$ | $v_4 = 26.55$ |
| $r_8 = -2.525$ | | |
| $d'_7 = 0.008$ | | |
| $r'_8 = -1.446$ | | |
| $d_8 = 0.116$ | $n_5 = 1.726$ | $v_5 = 53.56$ |
| $r_9 = -0.387$ | | |
| $d_9 = 0.002$ | | |
| $r_{10} = 4.976$ | | |
| $d_{10} = 0.097$ | $n_6 = 1.757$ | $v_6 = 47.87$ |
| $r_{11} = -0.826$ | | |
| $f = 1,$ | $n_4 - n_5 = 0.036$ | |
| $f_2 = -1.334,$ | $f_A = -8.847$ | |

-continued $f_{23} = -2.869$, $\quad L = 1.64$
$f_B = 0.918$

Embodiment 2:

$r_1 = 0.875$
$\quad d_1 = 0.070 \quad n_1 = 1.713 \quad \nu_1 = 53.89$
$r_2 = 4.081$
$\quad d_2 = 0.002$
$r_3 = 0.504$
$\quad d_3 = 0.040 \quad n_2 = 1.6172 \quad \nu_2 = 54.04$
$r_4 = 0.286$
$\quad d_4 = 0.035$
$r_5 = 0.294$
$\quad d_5 = 0.061 \quad n_3 = 1.6825 \quad \nu_3 = 44.65$
$r_6 = 0.358$
$\quad d_6 = 0.234$
$r_7 = -0.327$
$\quad d_7 = 0.023 \quad n_4 = 1.76182 \quad \nu_4 = 26.55$
$r_8 = -4.290$
$\quad d'_7 = 0.013$
$r'_8 = -1.299$
$\quad d_8 = 0.119 \quad n_5 = 1.713 \quad \nu_5 = 53.89$
$r_9 = -0.392$
$\quad d_9 = 0.002$
$r_{10} = 3.521$
$\quad d_{10} = 0.097 \quad n_6 = 1.757 \quad \nu_6 = 47.87$
$r_{11} = -0.816$
$f = 1 \quad\quad n_4 - n_5 = 0.049$
$f_2 = -1.154 \quad f_A = -4.761$
$f_{23} = -2.827 \quad L = 1.61$
$f_B = 0.918$

Embodiment 3:

$r_1 = 0.546$
$\quad d_1 = 0.090 \quad n_1 = 1.713 \quad \nu_1 = 53.89$
$r_2 = 1.538$
$\quad d_2 = 0.002$
$r_3 = 0.509$
$\quad d_3 = 0.028 \quad n_2 = 1.60342 \quad \nu_2 = 38.01$
$r_4 = 0.262$
$\quad d_4 = 0.088$
$r_5 = 0.289$
$\quad d_5 = 0.096 \quad n_3 = 1.6825 \quad \nu_3 = 44.65$
$r_6 = 0.285$
$\quad d_6 = 0.203$
$r_7 = -0.318$
$\quad d_7 = 0.024 \quad n_4 = 1.834 \quad \nu_4 = 37.19$
$r_8 = 1.352$
$\quad d_8 = 0.107 \quad n_5 = 1.6968 \quad \nu_5 = 56.49$
$r_9 = -0.377$
$\quad d_9 = 0.002$
$r_{10} = 5.257$
$\quad d_{10} = 0.088 \quad n_6 = 1.6968 \quad \nu_6 = 56.49$
$r_{11} = -0.563$
$f = 1, \quad f_2 = -0.933$
$f_{23} = -1.104, \quad f_B = 0.902$
$n_4 - n_5 = 0.1372, \quad L = 1.63$

Embodiment 4:

$r_1 = 0.560$
$\quad d_1 = 0.089 \quad n_1 = 1.72 \quad \nu_1 = 43.7$
$r_2 = 1.462$
$\quad d_2 = 0.002$
$r_3 = 0.495$
$\quad d_3 = 0.029 \quad n_2 = 1.62004 \quad \nu_2 = 36.25$
$r_4 = 0.275$
$\quad d_4 = 0.106$
$r_5 = 0.298$
$\quad d_5 = 0.093 \quad n_3 = 1.68250 \quad \nu_3 = 44.65$
$r_6 = 0.285$
$\quad d_6 = 0.215$
$r_7 = -0.309$
$\quad d_7 = 0.023 \quad n_4 = 1.78472 \quad \nu_4 = 25.71$
$r_8 = 1.736$
$\quad d_8 = 0.106 \quad n_5 = 1.70154 \quad \nu_5 = 41.10$
$r_9 = -0.370$
$\quad d_9 = 0.002$
$r_{10} = 6.881$
$\quad d_{10} = 0.087 \quad n_6 = 1.73520 \quad \nu_6 = 41.08$
$r_{11} = -0.642$
$f = 1, \quad f_2 = -1.054$
$f_{23} = -1.169, \quad f_B = 0.89$
$n_4 - n_5 = 0.0832, \quad L = 1.642$ In the above embodiments, reference symbols $r_1$ through $r_{11}$ respectively represent radii of curvature of respective lens surfaces, reference symbols $d_1$ through $d_{10}$ respectively represent thicknesses of respective lenses and airspaces between respective lenses, reference symbols $n_1$ through $n_6$ respectively represent refractive indices of respective lenses, and reference symbols $\nu_1$ through $\nu_6$ respectively represent Abbe's numbers of respective lenses.

Figure 2:
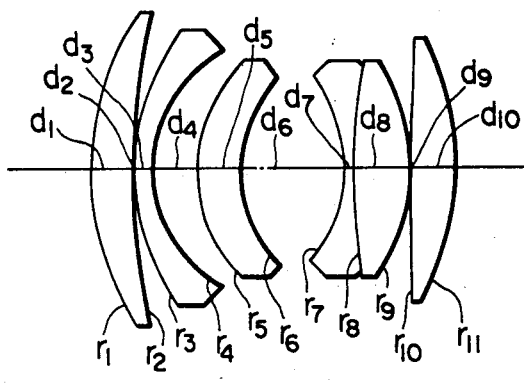
FIG. 2 shows a sectional view of Embodiments 3 and 4 of the lens system according to the present invention.
Figure 5:
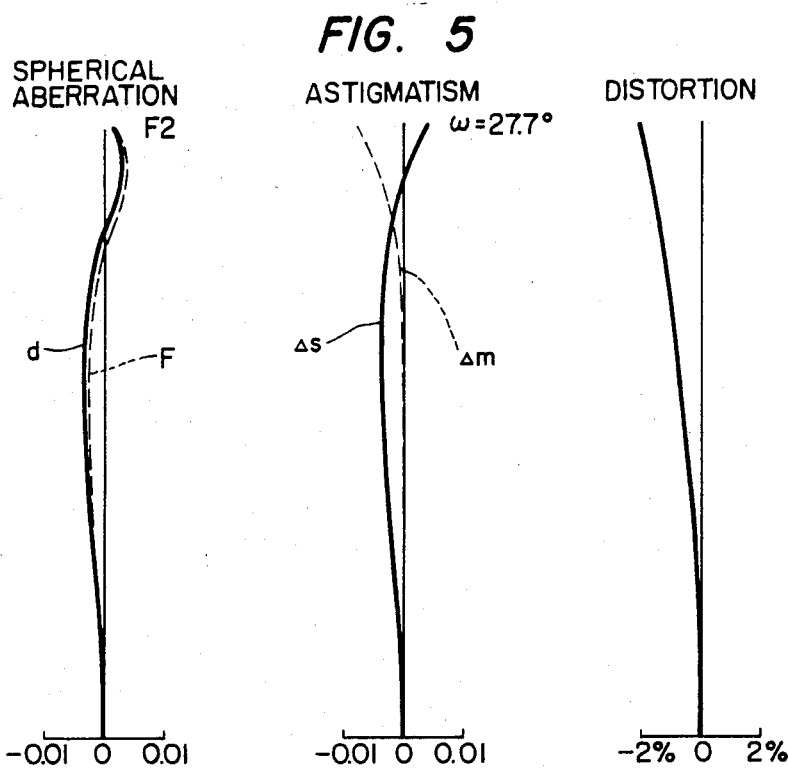
Figure 6:
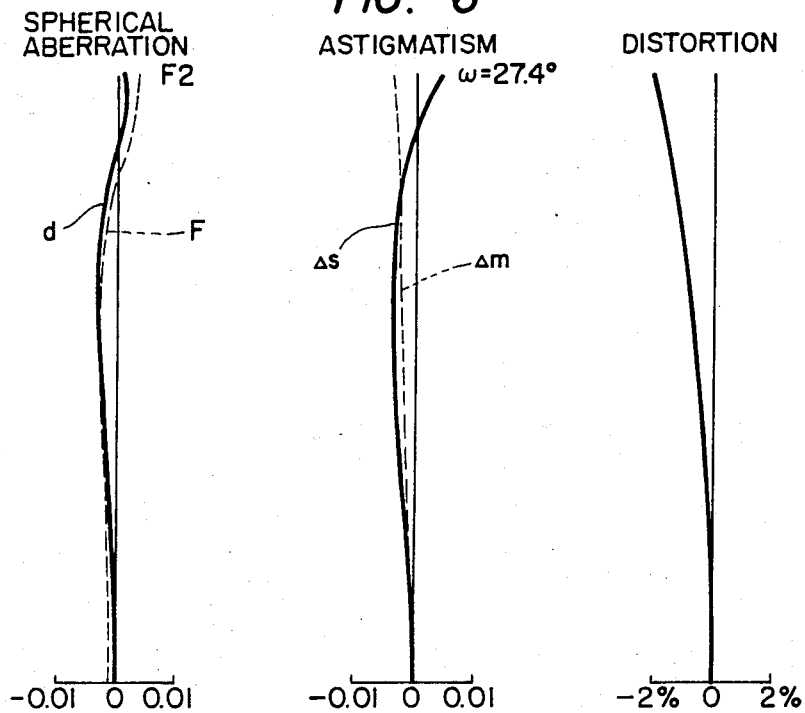

Out of the above embodiments, Embodiments 1 and 2 have lens configuration shown in FIG. 1 and their fourth lens components respectively consist of two lens elements, i.e., the negative and positive lens elements, which are separated from each other. Embodiments 3 and 4 have lens configuration shown in FIG. 2 and their fourth lens components are arranged as cemented doublets.

For Embodiments 2 and 4 out of the above embodiments, Seidel coefficients are shown below.

| | B | C | F | E | P |
|---|---|---|---|---|---|
| Embodiment 2: | | | | | |
| 1 | 0.3461 | 0.1100 | 0.1951 | 0.3260 | 0.4683 |
| 2 | 0.0495 | 0.4454 | −0.1485 | −1.0180 | −0.1059 |
| 3 | 0.0976 | 0.0278 | 0.0520 | 0.4113 | 0.7432 |
| 4 | −10.4557 | −0.0222 | −0.4820 | −0.0626 | −1.3349 |
| 5 | 9.6186 | 0.0844 | 0.9012 | 0.1354 | 1.3605 |
| 6 | −1.3773 | −0.2340 | −0.5677 | −0.5695 | −1.1477 |
| 7 | −4.3165 | −0.3666 | 1.2580 | 0.4922 | −1.3223 |
| 8 | −0.6917 | −1.4239 | −0.9924 | −1.8380 | 0.1428 |
| 8' | 0.2905 | 1.1349 | 0.5742 | 1.6453 | −0.3025 |
| 9 | 2.6307 | 0.0582 | −0.3912 | −0.1659 | 1.0572 |
| 10 | 0.0032 | 0.0899 | 0.0171 | 0.9041 | 0.0821 |
| 11 | 4.3294 | 0.0463 | −0.4478 | −0.0633 | 0.5654 |
| Σ | 0.5244 | −0.0499 | −0.0320 | 0.1970 | 0.2063 |
| Embodiment 4 | | | | | |
| 1 | 1.3836 | 0.0068 | 0.0971 | 0.0529 | 0.7471 |
| 2 | 0.0128 | 0.4849 | −0.0786 | −1.2240 | −0.2863 |
| 3 | −0.0690 | −0.0236 | −0.0404 | 0.4385 | 0.7729 |
| 4 | −7.5523 | −0.0370 | 0.5288 | 0.0999 | −1.3897 |
| 5 | 6.1953 | 0.0471 | 0.5402 | 0.1229 | 1.3626 |
| 6 | −3.0147 | −0.2496 | −0.8675 | −0.4809 | −1.4215 |
| 7 | −3.5800 | −0.4371 | 1.2510 | 0.6502 | −1.4236 |
| 8 | −0.3476 | −0.1643 | −0.2389 | −0.1238 | −0.0158 |
| 9 | 2.3679 | 0.1114 | −0.5136 | −0.2660 | 1.1150 |
| 10 | 0.0056 | 0.1352 | 0.0275 | 0.9690 | 0.0616 |
| 11 | 5.0901 | 0.0866 | −0.6639 | −0.0973 | 0.6595 |
| Σ | 0.4915 | −0.0397 | 0.0415 | 0.1414 | 0.1817 |

I claim:

1. A standard photographic lens system having wide field angle and comprising a first, second, third, fourth and fifth lens components, said first lens component being a positive meniscus lens arranged convex toward the object side, said second lens component being a negative meniscus lens arranged convex toward the object side, said third lens component being a positive meniscus lens arranged convex toward the object side, said fourth lens component consisting of a negative lens and positive lens, said fifth lens component being a biconvex lens, said standard photographic lens system satisfying the following conditions:

$1.55f < L < 1.7f$ \quad (1)

$0.88f < f_B < 0.93f$ \quad (2)

$-1.4f < f_2 < -0.8f$ \quad (3)

$-3.2f < f_{23} < -0.8f$ \quad (4)

$0.45f < r_3 < 0.52f$ \quad (5)

$0.26f < r_6 < 0.37f$ (6)

$-0.35f < r_7 < -0.3f$ (7)

$1.65 < n_6 < 1.8$ (8)

wherein reference symbol L represents the distance from the first surface of the lens system to the image surface, reference symbol f represents the focal length of the lens system as a whole, reference symbol $f_B$ represents the back focal length, reference symbol $f_2$ represents the focal length of the second lens component, reference symbol $f_{23}$ represents the total focal length of the second and third lens components, reference symbols $r_3$, $r_6$ and $r_7$ respectively represent radii of curvature of the surface on the object side of the second lens component, surface on the image side of the third lens component and surface on the object side of the fourth lens component, and reference symbol $n_6$ represents the refractive index of the fifth lens component.

2. A standard photographic lens system having a wide field angle according to claim 1, in which said fourth lens component consists of a negative lens and positive lens separated from each other.

3. A standard photographic lens system having a wide field angle according to claim 2 further satisfying the following conditions:

$0.03 < n_4 - n_5$ (9)

$0.03f < d_4$ (10)

$-10f < f_A$ (11)

$-3f < f_{23} < -2.8f$ (4')

wherein reference symbols $n_4$ and $n_5$ respectively represent refractive indices of respective lenses constituting the fourth lens component, reference symbol $d_4$ represents the airspace between the second and third lens components, and reference symbol $f_A$ represents the value expressed by the formula shown below wherein reference symbol $r_8$ represents the surface on the image side of the negative lens constituting the fourth lens component, reference symbol $r_8'$ represents the surface on the object side of the positive lens constituting the fourth lens component, and reference symbol $d_7'$ represents the airspace between said negative lens and said positive lens:

$$\frac{1}{f_A} = \frac{1-n_4}{n_4}\frac{1}{r_8} + \frac{n_5-1}{n_4}\frac{1}{r_8'} - \frac{(1-n_4)(n_5-1)}{n_4}\frac{d_7'}{r_8 r_8'}$$

4. A standard photographic lens system having a wide field angle according to claim 3, in which said standard photographic lens system has the following numerical data:

| | | |
|---|---|---|
| $r_1 = 1.072$ | | |
| $d_1 = 0.070$ | $n_1 = 1.72$ | $\nu_1 = 50.25$ |
| $r_2 = 5.078$ | | |
| $d_2 = 0.002$ | | |
| $r_3 = 0.464$ | | |
| $d_3 = 0.033$ | $n_2 = 1.60729$ | $\nu_2 = 49.29$ |
| $r_4 = 0.287$ | | |
| $d_4 = 0.043$ | | |
| $r_5 = 0.306$ | | |
| $d_5 = 0.089$ | $n_3 = 1.68250$ | $\nu_3 = 44.65$ |
| $r_6 = 0.344$ | | |
| $d_6 = 0.235$ | | |
| $r_7 = -0.327$ | | |
| $d_7 = 0.024$ | $n_4 = 1.76182$ | $\nu_4 = 26.55$ |
| $r_8 = -2.525$ | | |
| $d_7' = 0.008$ | | |
| $r_8' = -1.446$ | | |
| $d_8 = 0.116$ | $n_5 = 1.726$ | $\nu_5 = 53.56$ |
| $r_9 = -0.387$ | | |
| $d_9 = 0.002$ | | |
| $r_{10} = 4.976$ | | |
| $d_{10} = 0.097$ | $n_6 = 1.757$ | $\nu_6 = 47.87$ |
| $r_{11} = -0.826$ | | |
| $f = 1,$ | | $n_4 - n_5 = 0.036$ |
| $f_2 = -1.334,$ | | $f_A = -8.847$ |
| $f_{23} = -2.869,$ | | $L = 1.64$ |
| $f_B = 0.918$ | | | wherein reference symbols $r_1$ through $r_{11}$ respectively represent radii of curvature of respective lens surfaces, reference symbols $d_1$ through $d_{10}$ respectively represent thicknesses of respective lenses and airspaces between respective lenses, reference symbols $n_1$ through $n_6$ respectively represent refractive indices of respective lenses, and reference symbols $\nu_1$ through $\nu_6$ respectively represent Abbe's numbers of respective lenses.

5. A standard photographic lens system havin a wide field angle according to claim 3, in which said standard photographic lens system has the following numerical data:

| | | |
|---|---|---|
| $r_1 = 0.875$ | | |
| $d_1 = 0.070$ | $n_1 = 1.713$ | $\nu_1 = 53.89$ |
| $r_2 = 4.081$ | | |
| $d_2 = 0.002$ | | |
| $r_3 = 0.504$ | | |
| $d_3 = 0.040$ | $n_2 = 1.6172$ | $\nu_2 = 54.04$ |
| $r_4 = 0.286$ | | |
| $d_4 = 0.035$ | | |
| $r_5 = 0.294$ | | |
| $d_5 = 0.061$ | $n_3 = 1.6825$ | $\nu_3 = 44.65$ |
| $r_6 = 0.358$ | | |
| $d_6 = 0.234$ | | |
| $r_7 = -0.327$ | | |
| $d_7 = 0.023$ | $n_4 = 1.76182$ | $\nu_4 = 26.55$ |
| $r_8 = -4.290$ | | |
| $d_7' = 0.013$ | | |
| $r_8' = -1.299$ | | |
| $d_8 = 0.119$ | $n_5 = 1.713$ | $\nu_5 = 53.89$ |
| $r_9 = -0.392$ | | |
| $d_9 = 0.002$ | | |
| $r_{10} = 3.521$ | | |
| $d_{10} = 0.097$ | $n_6 = 1.757$ | $\nu_6 = 47.87$ |
| $r_{11} = -0.816$ | | |
| $f = 1,$ | | $n_4 - n_5 = 0.049$ |
| $f_2 = -1.154,$ | | $f_A = -4.761$ |
| $f_{23} = -2.827,$ | | $L = 1.61$ |
| $f_B = 0.918$ | | | wherein reference symbols $r_1$ through $r_{11}$ respectively represent radii of curvature of respective lens surfaces, reference symbols $d_1$ through $d_{10}$ respectively represent thicknesses of respective lenses and airspaces between respective lenses, reference symbols $n_1$ through $n_6$ respectively represent refractive indices of respective lenses, and reference symbols $\nu_1$ through $\nu_6$ respectively represent Abbe's numbers of respective lenses.

6. A standard photographic lens system having a wide field angle according to claim 1, in which said fourth lens component is arranged as a cemented doublet consisting of a negative lens and positive lens.

7. A standard photographic lens system having a wide field angle according to claim 6 further satisfying the following conditions:

$$0.07 < n_4 - n_5 \quad (12)$$

$$0.07f < d_4 \quad (13)$$

$$-1.2f < f_{23} < -1.07f \quad (4'')$$

wherein reference symbols $n_4$ and $n_5$ respectively represent refractive indices of respective lenses constituting the fourth lens component, and reference symbol $d_4$ represents the airspace between the second and third lens components.

8. A standard photographic lens system having a wide field angle according to claim 6, in which said standard photographic lens system has the following numerical data:

| | | |
|---|---|---|
| $r_1 = 0.546$ | | |
| $d_1 = 0.090$ | $n_1 = 1.713$ | $\nu_1 = 53.89$ |
| $r_2 = 1.538$ | | |
| $d_2 = 0.002$ | | |
| $r_3 = 0.509$ | | |
| $d_3 = 0.028$ | $n_2 = 1.60342$ | $\nu_2 = 38.01$ |
| $r_4 = 0.262$ | | |
| $d_4 = 0.088$ | | |
| $r_5 = 0.289$ | | |
| $d_5 = 0.096$ | $n_3 = 1.6825$ | $\nu_3 = 44.65$ |
| $r_6 = 0.285$ | | |
| $d_6 = 0.203$ | | |
| $r_7 = -0.318$ | | |
| $d_7 = 0.024$ | $n_4 = 1.834$ | $\nu_4 = 37.19$ |
| $r_8 = 1.352$ | | |
| $d_8 = 0.107$ | $n_5 = 1.6968$ | $\nu_5 = 56.49$ |
| $r_9 = -0.377$ | | |
| $d_9 = 0.002$ | | |
| $r_{10} = 5.257$ | | |
| $d_{10} = 0.088$ | $n_6 = 1.6968$ | $\nu_6 = 56.49$ |
| $r_{11} = -0.563$ | | |
| $f = 1,$ | $f_2 = -0.933$ | |
| $f_{23} = -1.104,$ | $f_B = 0.902$ | |
| $n_4 - n_5 = 0.1372,$ | $L = 1.63$ | | wherein reference symbols $r_1$ through $r_{11}$ respectively represent radii of curvature of respective lens surfaces, reference symbols $d_1$ through $d_{10}$ respectively represent thicknesses of respective lenses and airspaces between respective lenses, reference symbols $n_1$ through $n_6$ respectively represent refractive indices of respective lenses, and reference symbols $\nu_1$ through $\nu_6$ respectively represent Abbe's numbers of respective lenses.

9. A standard photographic lens system having a wide field angle according to claim 6, in which said standard photographic lens system has the following numerical data:

| | | |
|---|---|---|
| $r_1 = 0.560$ | | |
| $d_1 = 0.089$ | $n_1 = 1.72$ | $\nu_1 = 43.7$ |
| $r_2 = 1.462$ | | |
| $d_2 = 0.002$ | | |
| $r_3 = 0.495$ | | |
| $d_3 = 0.029$ | $n_2 = 1.62004$ | $\nu_2 = 36.25$ |
| $r_4 = 0.275$ | | |
| $d_4 = 0.106$ | | |
| $r_5 = 0.298$ | | |
| $d_5 = 0.093$ | $n_3 = 1.68250$ | $\nu_3 = 44.65$ |
| $r_6 = 0.285$ | | |
| $d_6 = 0.215$ | | |
| $r_7 = -0.309$ | | |
| $d_7 = 0.023$ | $n_4 = 1.78472$ | $\nu_4 = 25.71$ |
| $r_8 = 1.736$ | | |
| $d_8 = 0.106$ | $n_5 = 1.70154$ | $\nu_5 = 41.10$ |
| $r_9 = -0.370$ | | |
| $d_9 = 0.002$ | | |
| $r_{10} = 6.881$ | | |
| $d_{10} = 0.087$ | $n_6 = 1.73520$ | $\nu_6 = 41.08$ |
| $r_{11} = -0.642$ | | |
| $f = 1,$ | $f_2 = -1.054$ | |
| $f_{23} = -1.169,$ | $f_B = 0.89$ | |
| $n_4 - n_5 = 0.0832,$ | $L = 1.642$ | | wherein reference symbols $r_1$ through $r_{11}$ respectively represent radii of curvature of respective lens surfaces, reference symbols $d_1$ through $d_{10}$ respectively represent thicknesses of respective lenses and airspaces between respective lenses, reference symbols $n_1$ through $n_6$ respectively represent refractive indices of respective lenses, and reference symbols $\nu_1$ through $\nu_6$ respectively represent Abbe's numbers of respective lenses.

* * * * *